United States Patent
Meaney et al.

(10) Patent No.: US 8,156,839 B2
(45) Date of Patent: *Apr. 17, 2012

(54) VEHICLE GEAR BOX ACTUATOR

(75) Inventors: Todd Meaney, West Roxbury, MA (US); Thomas P. Schregardus, Somerville, MA (US); Robert Cicerchia, Sharon, MA (US); David Medina, El Paso, TX (US)

(73) Assignee: Stoneridge Control Devices, Inc., Canton, MA (US)

( * ) Notice: Subject to any disclaimer, the term of this patent is extended or adjusted under 35 U.S.C. 154(b) by 1167 days.

This patent is subject to a terminal disclaimer.

(21) Appl. No.: 11/258,829

(22) Filed: Oct. 26, 2005

(65) Prior Publication Data

US 2006/0169084 A1  Aug. 3, 2006

Related U.S. Application Data (60) Provisional application No. 60/622,151, filed on Oct. 26, 2004, provisional application No. 60/642,645, filed on Jan. 10, 2005.

(51) Int. Cl.
  *B60K 17/04* (2006.01)
  *B60K 17/12* (2006.01)
(52) U.S. Cl. .............. 74/473.12; 74/89.35; 74/335
(58) Field of Classification Search ............ 74/89.23, 74/335, 336 R, 473.1, 473.12, 424.71, 89.37, 74/89.35; 192/48.2, 48.9, 48.91, 53.1; 310/75 R, 310/78, 83, 98, 99, 100
See application file for complete search history.

(56) References Cited

U.S. PATENT DOCUMENTS

| | | | | |
|---|---|---|---|---|
| 2,854,113 | A | * | 9/1958 | Hallden ................. 192/141 |
| 3,682,283 | A | | 8/1972 | Sato |
| 4,268,814 | A | * | 5/1981 | Henrion et al. ......... 338/32 H |
| 4,858,481 | A | * | 8/1989 | Abraham ................. 74/89.38 |
| 5,557,154 | A | * | 9/1996 | Erhart ....................... 310/80 |
| 5,689,997 | A | * | 11/1997 | Schaller ................... 74/335 |
| 5,775,469 | A | * | 7/1998 | Kang ....................... 188/267 |
| 5,788,008 | A | * | 8/1998 | Fort et al. ................. 180/247 |
| 5,809,833 | A | * | 9/1998 | Newport et al. ........ 74/89.37 |
| 5,873,200 | A | * | 2/1999 | Henderson ................. 49/343 |

(Continued)

FOREIGN PATENT DOCUMENTS

JP       2003120670       4/2003

(Continued)

OTHER PUBLICATIONS

International Search Report and Written Opinion mailed Sep. 24, 2007 in corresponding PCT Patent Application No. PCT/US05/38722.

(Continued)

*Primary Examiner* — Richard W Ridley
*Assistant Examiner* — Gregory Prather
(74) *Attorney, Agent, or Firm* — Grossman, Tucker, Perreault & Pfleger, PLLC (57) ABSTRACT

A vehicle gear box shift actuator and apparatus including the same. The actuator includes a lead screw; a drive nut threaded on the lead screw; a plunger; a first spring disposed between the drive nut and a first end of the plunger; a second spring disposed between the drive nut and a second end of the plunger opposite from the first end. Non-contact position sensing of the actuator output is also provided.

16 Claims, 6 Drawing Sheets

U.S. PATENT DOCUMENTS

| | | | |
|---|---|---|---|
| 6,513,398 B1 * | 2/2003 | Finkemeyer | 74/89.28 |
| 6,586,927 B2 * | 7/2003 | Pfeil et al. | 324/207.2 |
| 6,736,233 B2 | 5/2004 | Beishline et al. | |
| 7,197,955 B2 * | 4/2007 | Sharma et al. | 74/335 |
| 7,350,432 B2 * | 4/2008 | Somschor et al. | 74/335 |
| 7,375,509 B2 * | 5/2008 | Meaney | 324/207.2 |
| 2004/0017187 A1 * | 1/2004 | Van Ostrand et al. | 324/207.21 |
| 2004/0254040 A1 | 12/2004 | Somschor et al. | |

FOREIGN PATENT DOCUMENTS

| | | |
|---|---|---|
| JP | 2003523501 | 8/2003 |
| WO | 0058704 | 10/2000 |

OTHER PUBLICATIONS

Japanese Notice of Reasons for Rejection dated Apr. 19, 2011 issued in related Japanese Patent Application No. 2007-539097.

* cited by examiner

VEHICLE GEAR BOX ACTUATOR

CROSS-REFERENCE TO RELATED APPLICATIONS

The present application claims the benefit of U.S. provisional patent application Ser. No. 60/622,151, filed on Oct. 26, 2004, and also claims the benefit of U.S. provisional patent application Ser. No. 60/642,645, filed on Jan. 10, 2005. The entire disclosures of all of the above-identified applications are incorporated herein by reference.

TECHNICAL FIELD

The present invention relates in general to a vehicle gear box shift actuator.

BACKGROUND

In recent years, commercial vehicles, sport utility vehicles and passenger vehicles capable of full-time or part-time 4-wheel drive and/or all-wheel-drive operation have become commonplace. In some configurations, the operator has the option of selecting 2-wheel or 4-wheel drive depending on the conditions at any given time. The vehicle may also, or alternatively, be configured to automatically move from one drive train or suspension operating condition to another condition based on road conditions sensed by the vehicle. For example, the vehicle may move from 2-wheel drive to 4-wheel drive, or may selectively drive particular wheels, when slippery road conditions are encountered. Connection and disconnection of a vehicle suspension stabilizer may also be established, either manually or automatically, due to road conditions.

To establish these changes in drive train or suspension operating conditions, a vehicle may be equipped with one or more electromechanical actuators, e.g. for changing the state of the front and/or rear differential, transfer case, and/or stabilizer bar system. Cost and reliability of such actuators are, of course, important considerations. There is thus a continuous need for cost-effective and reliable vehicle gear box shift actuators.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

For ease of explanation, an actuator consistent with the invention may be described herein in connection with the operation of a gear box, such as a transfer case of a 4-wheel drive vehicle, vehicle front differential, vehicle rear differential, transmission, etc. It will be appreciated, however, that an actuator consistent with the invention will be useful in connection with a variety of applications in and out of vehicles, such as stabilizer bars, parking brakes, interlocks, etc. It is to be understood, therefore, that illustrated exemplary embodiments described herein are provided only by way of illustration, and are not intended to be limiting.

Figure 1:
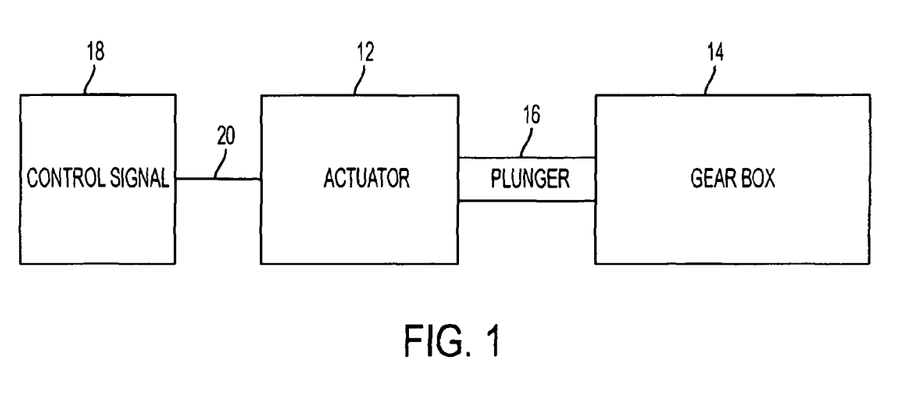
FIG. 1 is a block diagram of a system including an actuator consistent with the present invention.

FIG. 1 is a block diagram of a system 10 including an actuator 12 coupled to a gear box 14. Consistent with the present invention the gear box 14 may include a transfer case, a front differential, a rear differential, etc. The actuator 12 may include a plunger 16 for engaging the gear box 14, and/or one or more components within the gear box 14. For example, in an embodiment in which the gear box 14 is a transfer case of a four wheel drive vehicle, the plunger 16 may act on a shift fork within the gear box 14 for shifting the transfer case between all-wheel-drive and four-wheel-drive. The actuator 12 may be directly coupled to the gear box 14. Alternatively, the actuator and plunger may be indirectly coupled to the gear box, as through intermediary linkages, etc. The actuator 12 may operate in response to a control signal 18. According to various embodiments, the control signal 18 may be provided to the actuator 12 over a communication bus 20, such as a CAN or LIN bus.

Figure 2:
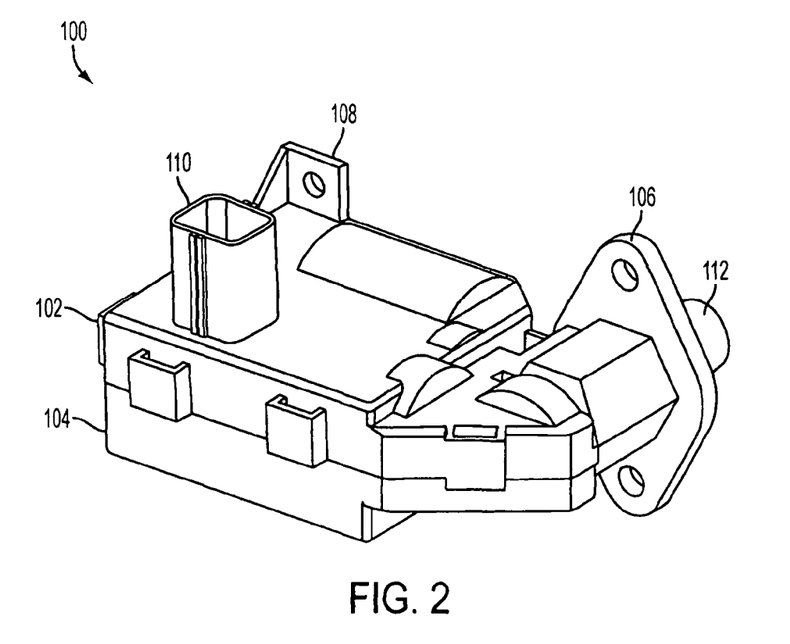
FIG. 2 is a perspective view of one exemplary embodiment of an actuator consistent with the invention.

Referring to FIG. 2, an embodiment of an actuator 100 is shown. The actuator 100 may generally include a body formed by upper and lower housing portions 102, 104 which may at least partially enclose a motor, a drive train, and, in some embodiments, control circuitry. The upper and lower housing 102, 104 may be formed from glass filled nylon, or other suitable materials, including plastic and metallic materials. The actuator 100 may include mounting features, such as flanges 106, 108 to facilitate mounting the actuator 100 to a gear box or other vehicle components or structure. As shown, the actuator 100 may include an integral connector 110, such as a four pin connector, for providing power and/or control signals to the actuator 100. Various embodiments of the actuator may include alternative connector configurations, such as pig tail connectors, for providing power and/or control signals to the actuator.

Figure 3:
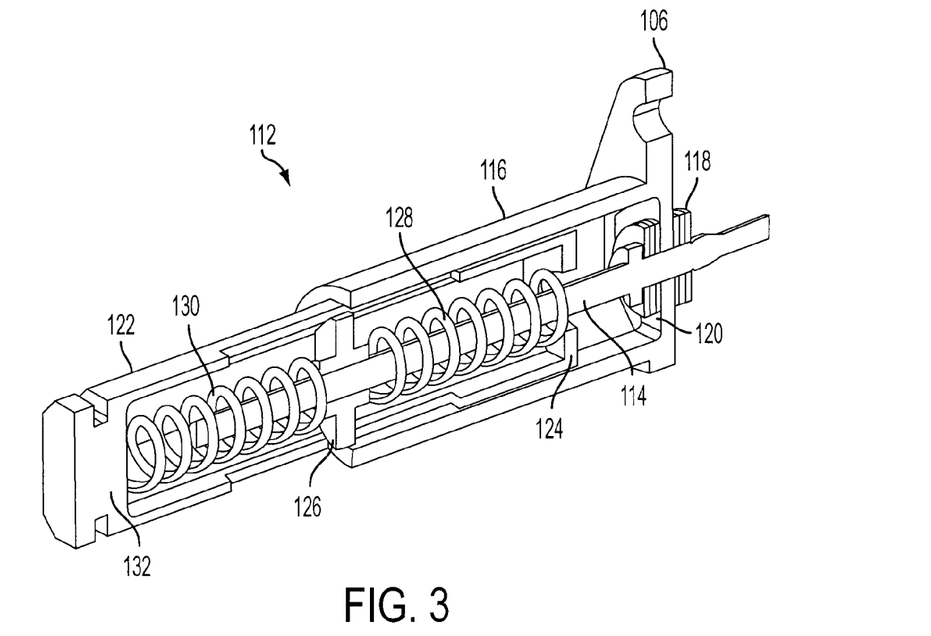
FIG. 3 is a section view of a portion of the actuator shown in FIG. 2 including a plunger assembly consistent with the present invention.

In the illustrated exemplary embodiment, the actuator 100 may include a plunger assembly 112. The plunger assembly 112 may be axially reciprocable in the actuator body. The plunger assembly 112 may be configured to provide blocked shift compensation. Referring to FIG. 3, a sectional view of an embodiment of the plunger assembly 112 is shown. A drive screw 114 may be coupled to an output of the actuator drive train (not shown) to obtain a desired gear reduction. The drive screw 114 may extend through a plunger housing 116, which may include an actuator mounting flange 106. Seals 118, 120 may be provided on the inside and the outside of the plunger housing 116 where the drive screw 114 enters the housing 116.

A plunger 122 may be slidably disposed at least partially within the plunger housing 116 so that it may axially reciprocate therein. The drive screw 114 may extend into the plunger 122 through an end wall 124 of the plunger 122. A drive nut 126 may be disposed on the drive screw 114 within the plunger 122. A first compliance spring 128 may be disposed between the drive nut 126 and the end wall 124 of the plunger 122, and a second compliance spring 130 may be disposed between the drive nut 126 and an opposed end wall 132 of the plunger 122. The first and second compliance springs 128, 130 may be helical coil springs, as shown.

The drive nut 126 may move axially along the drive screw 114 as the drive screw 114 is rotationally driven by an actuator drive train. Under normal operating conditions the plunger 122 may move along with the drive nut 126 to drive a driven member, e.g., a shift fork of a gear box, etc. When the plunger travel is prohibited by a blocked condition, e.g., movement of the driven member is blocked, the compliance springs 128, 130 inside the plunger 122 may allow the drive nut 126 to travel along the drive screw 114 while the plunger remains stationary. As the drive nut 126 moves along the drive screw 114 it may compress one of the compliance springs 128, 130, depending upon the direction of rotation of the drive screw 114. When the blocked condition is cleared/removed, energy stored in the compressed compliance springs 128, 130 may drive the plunger 122 into an equilibrium position between the two compliance springs 128, 130. The energy stored in the compressed compliance springs 128, 130 in the even of a blocked condition may be sufficient to move the driven member to a desired position once the blocked condition is cleared/removed. An example of a blocked shift compensation arrangement is disclosed in U.S. patent application Ser. No. 11/108,351, the entire disclosure of which is incorporated herein by reference.

Figure 4:
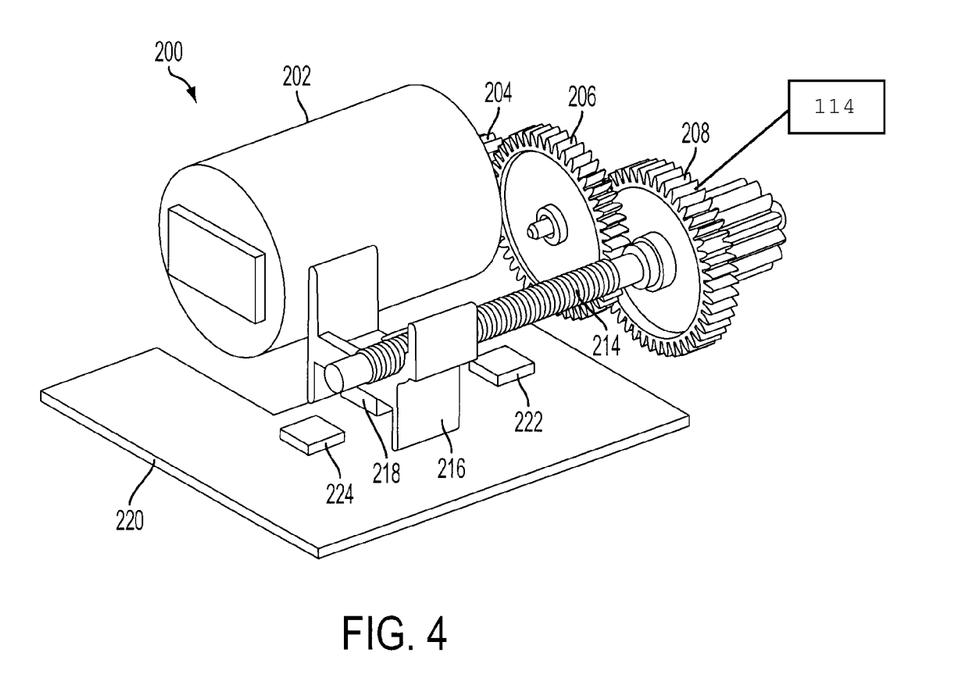
FIG. 4 is a perspective view of an exemplary non-contact position sensing system consistent with the present invention.

FIG. 4 is a perspective view of the internal components of an embodiment of an actuator 200. As shown, the actuator 200 may include a reversible motor 202, which may be a permanent magnet DC motor. The motor 202 may be coupled to an actuator drive train. An embodiment of an actuator drive train may include a pinion gear 204, which may be disposed on an output shaft of the motor 202. The pinion gear 204 may be drivingly coupled to, e.g., in meshing engagement with, a first compound gear 206. The first compound gear 206 may, in turn, be drivingly coupled to an output gear 208, which may also be a compound gear. Various alternative and/or additional drive train configurations may suitably be employed consistent with the present invention. According to an embodiment, the output gear 208 may be coupled to an actuator output, such as a drive screw 114 of a plunger assembly 112, discussed with reference to FIG. 3.

The actuator 200 may further include a non-contact position sensing system. In an exemplary embodiment, the non-contact position sensing system may provide an output in response to a position of the drive nut of the plunger assembly. The non-contact position sensing system may include a sensor drive screw 214 coupled to the output gear 208, of the actuator drive train. For example, as shown, the sensor drive screw 214 may be provided extending from the center of the output gear 208. A carrier 216 may be disposed on the sensor drive screw 214 for reciprocating movement along the sensor drive screw 214 depending upon the direction of rotation of the motor 202.

A magnet 218 may be coupled to, and may move with, the carrier 216. The carrier 216 and magnet 218 may travel over a printed circuit board (PCB) 220 which may include at least one magnetic field sensor, such as a Hall Effect sensor, a flux gate sensor, reed switch, etc. In the illustrated exemplary embodiment, two Hall Effect sensors 222, 224 may be disposed on the PCB. The Hall Effect sensors 222, 224 may provide an output in response a position of the magnet 218 on the carrier 216. The position of the magnet may be directly related to the position of the actuator output.

In one embodiment, the Hall Effect sensors 222, 224 may be switching Hall Effect sensors. In such an embodiment, when the magnet 218 is adjacent to, e.g., disposed above, the first Hall Effect sensor 222, the first Hall Effect sensor 222 may provide an output corresponding to an "on" condition. The second Hall Effect sensor 224 may provide an output corresponding to an "off" condition. Conversely, when the magnet 218 is adjacent to, e.g., disposed above, the second Hall Effect sensor 224, the second Hall Effect sensor 224 may provide an output corresponding to an "on" condition, and the first Hall Effect sensor 222 may provide an output corresponding to an "off" condition. Such an embodiment of a non-contact position sensing system may provide a signal in response to an end of travel position of the magnet 218 and carrier 216 in either direction. The end of travel position of the magnet 218 and carrier 216 may correspond to an end of travel position of the drive nut of the plunger assembly.

Other embodiments of the position sensing system may utilize linear Hall Effect devices. Such embodiment may provide an output in response to an end of travel position. Additionally, the position sensing system may also provide an output in response to a position of the magnet and carrier between the end of travel positions. In related embodiments, a position sensing system may include more than two magnetic field sensors disposed along the travel path of travel of the magnet and carrier. Additional magnetic field sensors may indicate intermediate positions of the magnet and carrier between the end of travel positions, and/or for improve the resolution of the position sensing system. Further embodiments of a non-contact position sensing system consistent with the present invention may utilize non-contact sensors other than magnetic field sensors, such as optical sensors, etc.

Figure 5:
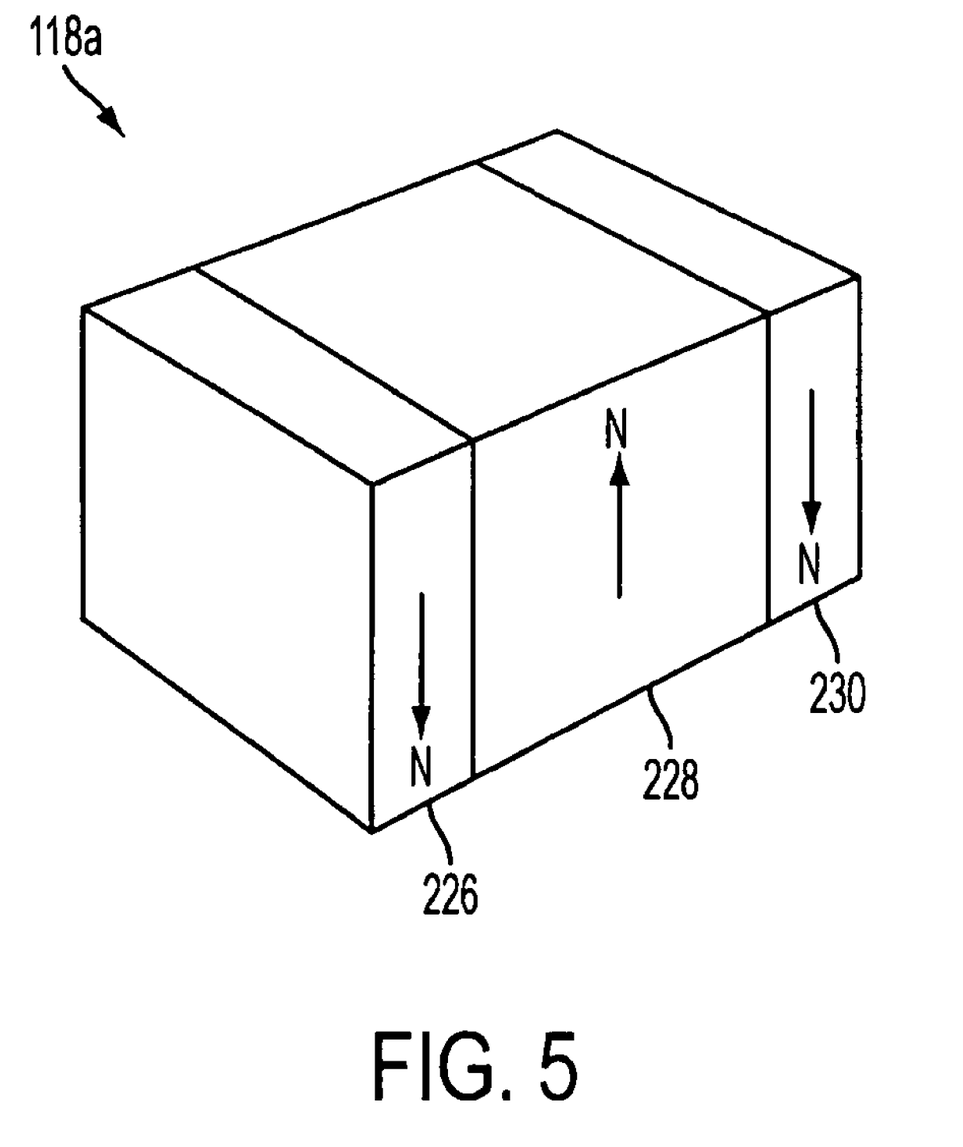
FIG. 5 is a perspective view of a tripole magnet which may suitably be used in connection with a non-contact position sensing system consistent with the present invention.
Figure 6:
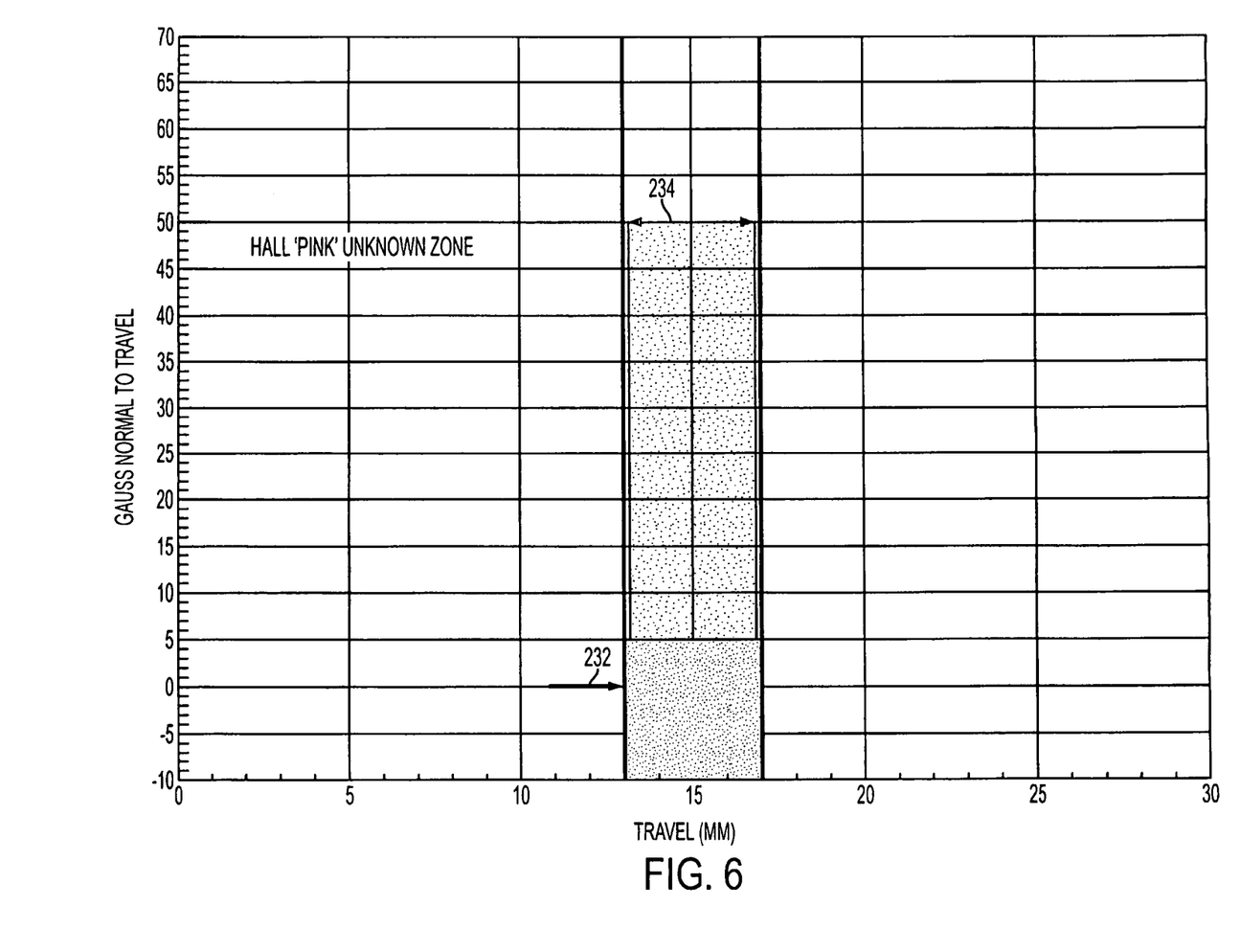
FIG. 6 depicts exemplary switching zone characteristics of a Hall device used in combination with a tripole magnet consistent with the present invention.

As shown in FIG. 5, the magnet may be a tripole magnet 218a. As shown, the tripole magnet 218a may include regions of alternating polarity 226, 228, 230. In the illustrated embodiment, the outer regions 226, 230 may be narrower than the middle region 228. In various embodiments, the tripole magnet 218a may include a unitary magnetized body. Alternatively, the tripole magnet may be a bonded structure including discrete magnets bonded to one another to provide the regions of alternating polarity. As shown in FIG. 6, a tripole magnet may reduce the hysteresis effect of a Hall Effect device when turning on and off. The reduction in hysteresis may be experienced as a reduction in the "gray" or unknown zone 232, for example as compared to the "on" zone 234. The tripole magnet may, therefore, provide improved switching accuracy of a Hall Effect device.

Figure 7:
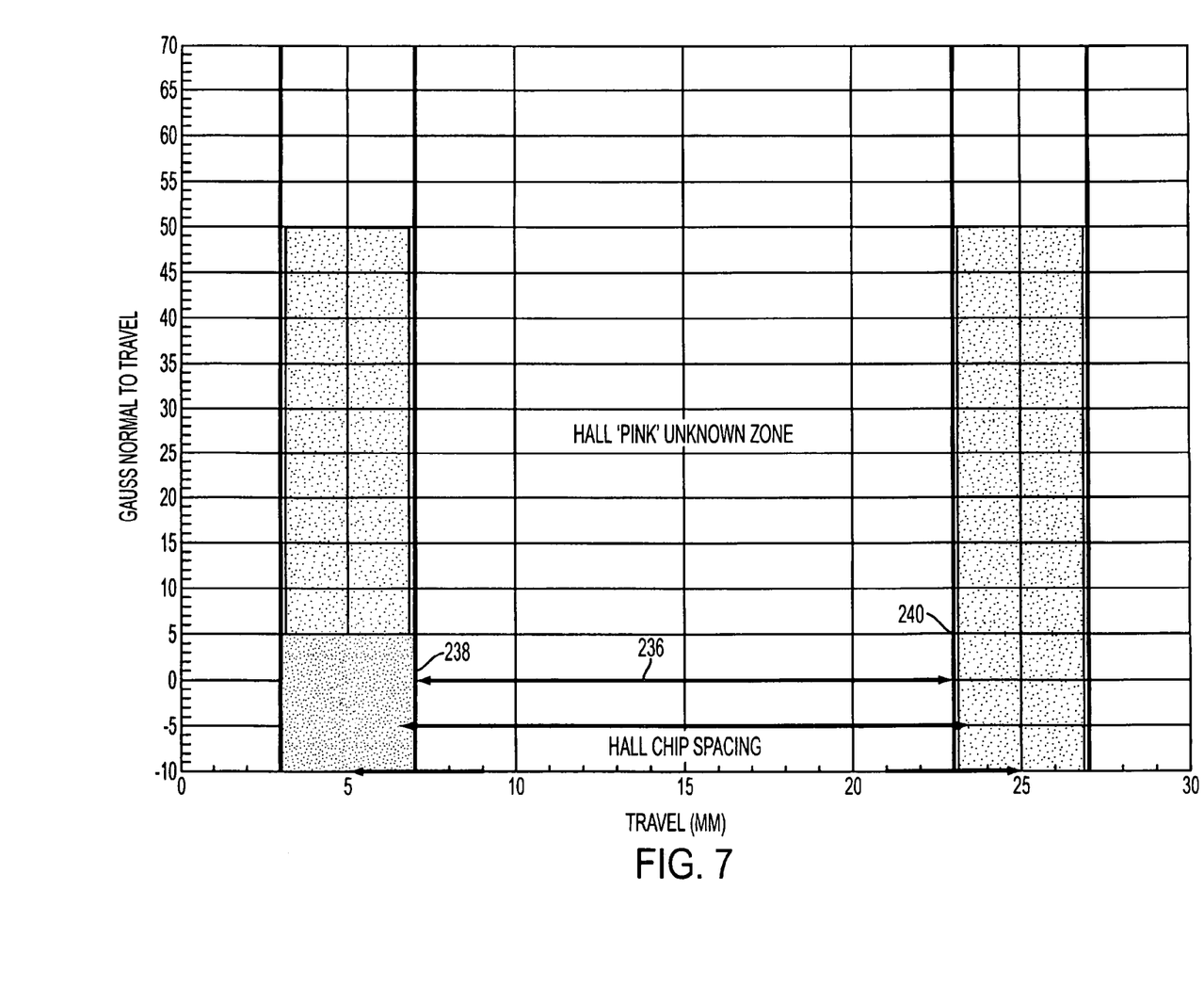
FIG. 7 depicts exemplary switching zone characteristics for first and second Hall devices consistent with the present invention.

As shown in FIG. 7, in a position sensing system including a pair of spaced apart Hall Effect sensors, such as used in the exemplary non-contact position sensing system of FIG. 4, the use of a tripole magnet provides increased travel 236 between the gray zones 236, 238 of the two Hall Effect sensors relative to the spacing between the switching zones 240. The reduction in the "gray zones" 236, 238 may increase the accuracy of a position sensing system utilizing Hall Effect sensors. In addition to reducing the "gray zone" experienced by a Hall Effect sensor, a tripole magnet may also provide more accurate and reliable performance over a larger voltage, temperature and time ranges.

Figure 8:
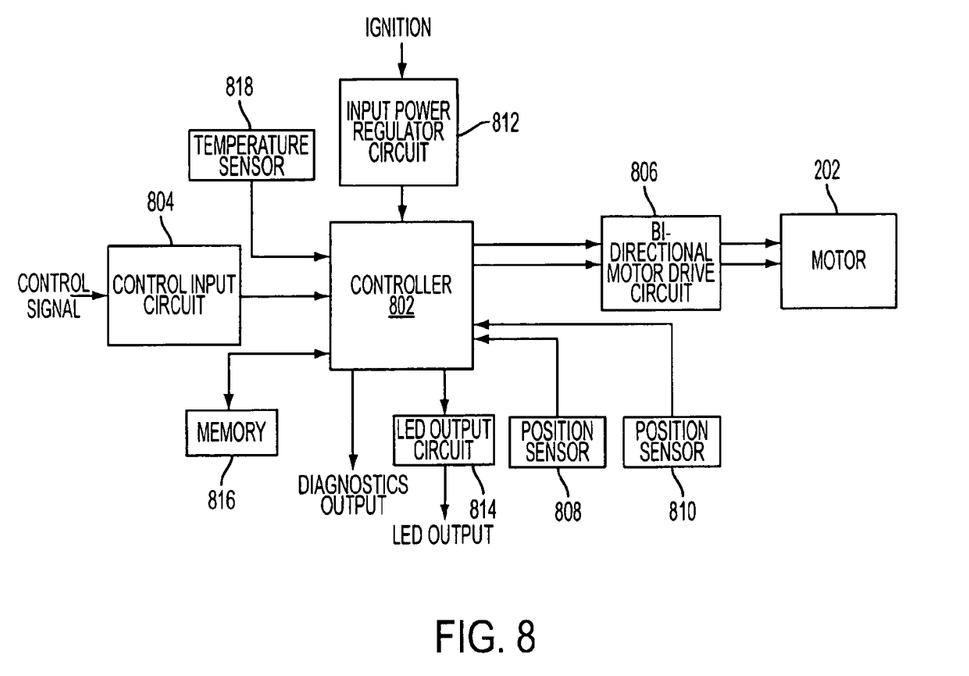
FIG. 8 is a block diagram of an exemplary motor control electronics configuration consistent with the present invention.

Turning now to FIG. 8, there is illustrated, in block diagram form, an exemplary configuration for motor control electronics 800 consistent with the present invention. The illustrated exemplary embodiment includes a controller 802 coupled to a control circuit 804 for receiving a control input in response to a CONTROL SIGNAL provided to the actuator. An IGNI- TION input to the actuator may be coupled to an input power regulator circuit 812 for providing a stable supply voltage to the controller 802. In general, the controller 802 provides outputs to a bidirectional motor drive circuit 806 for driving the actuator motor 202 in response to the CONTROL SIGNAL and outputs from one or more position sensors 808, 810, e.g. Hall sensors 222, 224. The controller may also be coupled to an LED output circuit 814 configured to provide an output for driving an LED display indicating the actuator position.

A machine readable memory device 816 may be coupled to the processor for storing instructions, e.g. software instructions, for execution by the controller 802 in controlling the motor drive and/or diagnostic data accessible through a DIAGNOSTICS OUTPUT from the controller. The diagnostics data may include temperature data obtain through a known temperature sensor 818 coupled to the controller. Diagnostics data may be transmitted and received over the vehicle communications bus, e.g. a CAN or LIN bus, and may be requested from the processor via an interface (not shown) with the CAN or LIN bus or other element.

The motor control electronics may be configured to drive the motor for achieving a desired motor output shaft position, e.g. for placing a transfer case in a 4WD or 2WD state, in response to the CONTROL SIGNAL in the form of a pulse to provide momentary control of the actuator position. In one embodiment for example, the CONTROL SIGNAL pulse may be a 80 ms, 12V pulse input to the actuator. Also, the components of the motor control electronics 800 may be selected to provide reliable operation with momentary control over a temperature range from −40° C. to 140° C. at operating voltages from 9-16 VDC.

In the illustrated exemplary embodiment, the CONTROL SIGNAL pulse is received by the control input circuit. In one embodiment, the control input circuit may be configured to provide a switch de-bounce feature and a ground float tolerance, e.g. 1.5V. Also the control input circuit may be configured to draw relatively low current, e.g. 15 mA, when the actuator is powered, and may be protected from electrostatic discharge.

The output of the control input circuit may be a pulse coupled to the controller 802. The controller 802 may be configured to provide a motor control outputs to the bi-directional motor drive circuit 806 in response to the output of the control input circuit 804 and the output(s) or one or more position sensors 808, 810 to drive the motor to a desired position. The motor control outputs from the controller 802 may be pulse width modulated (PWM) for allowing stability, low power consumption over large voltage and temperature ranges, and soft start functionality. The controller may also be configured to provide intelligent loss of power recovery for ensuring the position of the actuator is not lost during a power failure event. Upon power up, for example, the controller may command the actuator to a predetermined position, e.g. either the 4WD or 2WD position. Alternatively, direction of travel may be stored in memory 816 upon shift request, and the controller may command the actuator to continue the stored direction of travel once power has been restored.

The controller 802 may be any type of electronic circuit capable of providing the speed and functionality required by the embodiments of the invention. For example, the controller may be configured as a microprocessor, field programmable gate array (FPGA), complex programmable logic device (CPLD), application specific integrated circuit (ASIC), or other similar device. In an embodiment where the controller is configured as a microprocessor, the processor could be a processor from the Pentium® family of processors made by Intel Corporation, or the family of processors made by Motorola. Software instructions for causing the controller/processor to provide an appropriate output may be stored on any machine-readable media capable of storing instructions adapted to be executed by the processor/controller, e.g. on memory 814. As used herein, the phrase "adapted to be executed by a processor" is meant to encompass instructions stored in a compressed and/or encrypted format, as well as instructions that have to be compiled or installed by an installer before being executed by the processor.

The bi-directional motor drive circuit 806 may include a known motor drive circuit, such as an NEC EX2-N5 drive circuit available from NEC Corporation. In one embodiment, the controller may be configured to provide first and second outputs to the motor drive circuit 806 for commanding the motor to 2WD and 4WD, respectively. The motor drive circuit 806 may provide a motor control outputs to drive the motor in a first or second direction of rotation in response to the controller outputs.

The LED output circuit 814 may receive an LED output from the controller for indicating the position of the actuator, e.g. 2WD or 4WD. The LED output circuit 814 may provide an LED drive current at the output of the actuator for providing a visual indication of the position of the system driven by the actuator. In one embodiment, the LED output circuit may be configured to provide a 13.8 v, 100 mA LED drive current at 25° C.

Supply voltage to the controller 802 may be provided by the input power regulator circuit 812. The input power regulator circuit 812 may receive a voltage regulator, e.g. a 5V regulator, for providing a stable supply voltage to the controller from a 12V IGNITION input. In one embodiment, the input power regulator circuit may also provide a low drop out voltage, a low quiescent current, may include circuitry to protect against connection of a vehicle battery with reversed polarity, and may be ESD protected.

According to one aspect of the invention, there is thus provided a vehicle gear box shift actuator including a lead screw; a drive nut threaded on the lead screw; a plunger; a first spring disposed between the drive nut and a first end of the plunger; a second spring disposed between the drive nut and a second end of the plunger opposite from the first end; and a motor coupled to the lead screw. The drive nut is configured to move along the lead screw upon energization of the motor to cause corresponding movement of the plunger until the plunger is in a blocked condition. Upon occurrence of the blocked condition the drive nut is configured to move relative to the plunger to compress at least one of the first and second springs to store energy for returning the drive nut to an equilibrium position along the lead screw when the blocked condition is removed.

According to another aspect of the invention, there is provided a non-contact position sensing system including a lead screw driven by an actuator drive train including a motor. A carrier may be coupled to the lead screw and a magnet coupled to the carrier. The carrier may be configured to move along the lead screw upon energization of the motor to cause corresponding movement of the magnet. The non-contact position sensing system may further include a first and second magnetic field sensor disposed along the path of travel of the carrier and magnet. The first and second magnetic field sensors may provide an output in response to an end of travel position of the carrier in either direction.

According to another aspect of the invention, there are provided motor control electronics for a vehicle gear box shift actuator for providing reliable operation with momentary control over a temperature range from −40° C. to 140° C. at operating voltages from 9-16 VDC. The electronics may include a microprocessor controller for driving the motor in response to a control signal input to the actuator and an output from one or more position sensors.

The embodiments that have been described herein, however, are but some of the several which utilize this invention and are set forth here by way of illustration but not of limitation. Additionally, it will be appreciated that aspects of the various embodiments may be combined in other embodiments. It is obvious that many other embodiments, which will be readily apparent to those skilled in the art, may be made without departing materially from the spirit and scope of the invention as defined in the appended claims.

What is claimed is:

1. An actuator comprising:
   a motor;
   a drive train coupled to said motor, said drive train having an output gear coupled to a first and a second lead screw;
   said first lead screw coupled to a drive nut and configured for driving said drive nut to a drive nut position between a first drive nut end of travel position and a second drive nut end of travel position when said motor is energized, said drive nut coupled to a plunger via a first and second spring,
   said second lead screw coupled to a magnet, said second lead screw configured for moving said magnet to a magnet position between a first magnet end of travel position and a second magnet end of travel position when said motor is energized, wherein said drive nut position corresponds to said magnet position; and
   at least one magnetic field sensor configured to provide an output in response to said magnet position, said output indicating said drive nut position;
   wherein said first and second lead screws are configured to simultaneously drive and move said drive nut and said magnet, respectively.

2. An actuator according to claim 1, wherein said drive nut is configured to compress one of said first and second springs to store energy when said plunger is in a blocked condition.

3. An actuator according to claim 2, wherein said first and second springs are configured to release said stored energy to drive said plunger when said blocked condition is removed.

4. An actuator according to claim 1, wherein said magnetic field sensor comprises a Hall Effect sensor.

5. An actuator according to claim 1, comprising a first and second magnetic field sensors associated with said first and second magnet end of travel positions, each of said magnetic field sensors providing an associated output in response to a position of said magnet.

6. An actuator according to claim 1, wherein said magnet comprises three regions having alternating polarity.

7. An actuator according to claim 1, wherein said first and second springs comprise helical coil springs.

8. An actuator according to claim 1, said actuator further comprising a controller, said controller being configured to energize said motor to drive said drive nut to at least one of said first and second drive nut end of travel positions in response to a pulsed input signal.

9. A vehicle system comprising:
   a vehicle gear box;
   an actuator coupled to said gearbox, said actuator comprising:
   a motor;
   a drive train coupled to said motor, said drive train having an output gear coupled to a first and a second lead screw;
   said first lead screw coupled to a drive nut and configured for driving said drive nut to a drive nut position between a first drive nut end of travel position and a second drive nut end of travel position when said motor is energized, said drive nut coupled to a plunger via a first and second spring, said plunger being coupled to a movable element of said gear box for placing said gearbox in a first operating state when said drive nut is in said first drive nut end of travel position and a second operating state when said drive nut is in said second drive nut end of travel position;
   said second lead screw coupled to a magnet, said second lead screw configured for moving said magnet to a magnet position between a first magnet end of travel position and a second magnet end of travel position when said motor is energized, wherein said drive nut position corresponds to said magnet position; and
   at least one magnetic field sensor configured to provide an output in response to said magnet position, said output indicating said drive nut position;
   wherein said first and second lead screws are configured to simultaneously drive and move said drive nut and said magnet, respectively.

10. A system according to claim 9, wherein said drive nut is configured to compress one of said first and second springs to store energy when said plunger is in a blocked condition.

11. A system according to claim 10, wherein said first and second springs are configured to release said stored energy to drive said plunger when said blocked condition is removed.

12. A system according to claim 9, wherein said magnetic field sensor comprises a Hall Effect sensor.

13. A system according to claim 9, comprising a first and second magnetic field sensors associated with said first and second magnet end of travel positions, each of said magnetic field sensors providing an associated output in response to a position of said magnet.

14. A system according to claim 9, wherein said magnet comprises three regions having alternating polarity.

15. A system according to claim 9, wherein said first and second springs comprise helical coil springs.

16. A system according to claim 9, said actuator further comprising a controller, said controller being configured to energize said motor to drive said drive nut to at least one of said first and second drive nut end of travel positions in response to a pulsed input signal.

* * * * *